US012307937B2

(12) United States Patent
Yim et al.

(10) Patent No.: US 12,307,937 B2
(45) Date of Patent: May 20, 2025

(54) DISPLAY DEVICE INCLUDING A DEMULTIPLEXER CIRCUIT

(71) Applicant: SAMSUNG DISPLAY CO., LTD., Yongin-si (KR)

(72) Inventors: Dale Yim, Yongin-si (KR); Seongkyun Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/447,816

(22) Filed: Aug. 10, 2023

(65) Prior Publication Data

US 2024/0169875 A1 May 23, 2024

(30) Foreign Application Priority Data

Nov. 23, 2022 (KR) ........................ 10-2022-0158023

(51) Int. Cl.
*G09G 3/20* (2006.01)
*G09G 3/32* (2016.01)
*G09G 3/3291* (2016.01)

(52) U.S. Cl.
CPC ............. *G09G 3/2003* (2013.01); *G09G 3/32* (2013.01); *G09G 3/3291* (2013.01); *G09G 2300/0426* (2013.01); *G09G 2300/0452* (2013.01); *G09G 2310/027* (2013.01); *G09G 2310/0297* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 10,839,754 | B2 * | 11/2020 | Kim | G09G 3/3291 |
| 11,587,489 | B2 * | 2/2023 | Zhou | G09G 3/2003 |
| 11,715,406 | B2 * | 8/2023 | Park | G09G 3/3283 345/690 |
| 2016/0078836 | A1 * | 3/2016 | Kim | G09G 3/3688 345/209 |
| 2016/0321977 | A1 * | 11/2016 | Kong | G09G 3/2003 |
| 2017/0345357 | A1 * | 11/2017 | Kong | G09G 3/2003 |
| 2018/0151145 | A1 * | 5/2018 | Lee | G09G 5/02 |
| 2018/0211579 | A1 * | 7/2018 | Bae | G09G 3/2003 |
| 2019/0080652 | A1 * | 3/2019 | Kim | G09G 3/3291 |
| 2022/0165197 | A1 * | 5/2022 | Zhou | G09G 3/2003 |
| 2023/0018362 | A1 * | 1/2023 | Park | G09G 3/3241 |

FOREIGN PATENT DOCUMENTS

| | | |
|---|---|---|
| KR | 10-2016-0129246 | 11/2016 |
| KR | 10-2018-0087644 | 8/2018 |

* cited by examiner

*Primary Examiner* — Kenneth Bukowski
(74) *Attorney, Agent, or Firm* — CHAU & ASSOCIATES, LLC

(57) ABSTRACT

A display device includes a display panel, a data driver and a demultiplexer circuit. The display panel includes first, second, third and fourth data lines, and first, second, third and fourth sub-pixels respectively coupled to the first, second, third and fourth data lines. The data driver includes a first output channel and a second output channel. The demultiplexer circuit selectively couples at least one of the first data line and the third data line to the first output channel in response to first and second switching signals, and selectively couples at least one of the second data line and the fourth data line to the second output channel in response to third and fourth switching signals different from the first and second switching signals.

21 Claims, 15 Drawing Sheets

FIG. 6

| | | | | |
|---|---|---|---|---|
| R1 | G1 | B1 | G2 | |
| RV1 | GV1 | BV1 | GV1 | ... |
| B2 | G3 | R2 | G4 | |
| BV2 | GV3 | RV2 | GV3 | |

⋮

FIG. 8

| | | | | |
|---|---|---|---|---|
| R1 | G1 | B1 | G2 | |
| RV1 | GV1 | BV1 | X | ... |
| B2 | G3 | R2 | G4 | |
| BV2 | GV3 | RV2 | X | |

⋮

FIG. 10

FP1

| | | | |
|---|---|---|---|
| R1 | G1 | B1 | G2 |
| RV1 | GV1 | BV1 | X |
| B2 | G3 | R2 | G4 |
| BV2 | GV3 | RV2 | X |

...

⋮

⇕

FP2

| | | | |
|---|---|---|---|
| R1 | G1 | B1 | G2 |
| RV1 | X | BV1 | GV2 |
| B2 | G3 | R2 | G4 |
| BV2 | X | RV2 | GV4 |

...

⋮

FIG. 12

| | | | |
|---|---|---|---|
| R1 | G1 | B1 | G2 |
| RV1 | GV1 | BV1 | X |
| B2 | G3 | R2 | G4 |
| BV2 | X | RV2 | GV4 |
| R3 | G5 | B3 | G6 |
| RV3 | GV5 | BV3 | X |
| B4 | G7 | R4 | G8 |
| BV4 | X | RV4 | GV8 |

...

⋮

FIG. 14

FP1

| | | | |
|---|---|---|---|
| R1 | G1 | B1 | G2 |
| RV1 | GV1 | BV1 | X |
| B2 | G3 | R2 | G4 |
| BV2 | X | RV2 | GV4 |
| R3 | G5 | B3 | G6 |
| RV3 | GV5 | BV3 | X |
| B4 | G7 | R4 | G8 |
| BV4 | X | RV4 | GV8 |

...

⋮

⇕

FP2

| | | | |
|---|---|---|---|
| R1 | G1 | B1 | G2 |
| RV1 | X | BV1 | GV2 |
| B2 | G3 | R2 | G4 |
| BV2 | GV3 | RV2 | X |
| R3 | G5 | B3 | G6 |
| RV3 | X | BV3 | GV6 |
| B4 | G7 | R4 | G8 |
| BV4 | GV7 | RV4 | X |

...

⋮

DISPLAY DEVICE INCLUDING A DEMULTIPLEXER CIRCUIT

CROSS-REFERENCE TO RELATED APPLICATION(S)

This application claims priority under 35 USC § 119 to Korean Patent Application No. 10-2022-0158023, filed on Nov. 23, 2022, in the Korean Intellectual Property Office (KIPO), the disclosure of which is incorporated by reference herein in its entirety.

BACKGROUND

1. Technical Field

One or more embodiments disclosed herein relate to a display device including a demultiplexer circuit.

2. Description of the Related Art

To increase the resolution of a display panel, a display device having an RGBG pixel arrangement has been developed. In an RGBG pixel arrangement, a blue sub-pixel and/or a red sub-pixel are shared by two adjacent pixels. Thus, each pixel may have two sub-pixels, one green sub-pixel and one red or one blue sub-pixel. Through this arrangement, pixel size may be reduced, which, in turn, has the effect of increasing the resolution of the display panel.

To reduce the number of output channels of a data driver, a demultiplexing driving technique has been developed. According to this technique, each output channel may be selectively coupled to two or more data lines using a demultiplexer circuit. In some cases, the demultiplexer circuit may sequentially couple each output channel to two or more data lines within each horizontal time in a time-division manner. Accordingly, in a display device which implements a demultiplexing driving technique, the number of output channels may be less than the number of the data lines.

SUMMARY

Some embodiments provide a display panel capable of reducing power consumption and efficiently performing a demultiplexing operation for purposes of applying data voltages to respective ones of a plurality of pixels.

Some embodiments provide a display panel as indicated above which apply data voltages to the plurality of pixels arranged in an RGBG configuration.

According to some embodiments, there is provided a display device including a display panel including first, second, third and fourth data lines, and first, second, third and fourth sub-pixels respectively coupled to the first, second, third and fourth data lines, a data driver including a first output channel and a second output channel, and a demultiplexer circuit configured to selectively couple at least one of the first data line and the third data line to the first output channel in response to corresponding ones of first and second switching signals, and to selectively couple at least one of the second data line and the fourth data line to the second output channel in response to corresponding ones of third and fourth switching signals different from the first and second switching signals.

In embodiments, the first and second switching signals may be transferred through first and second switching signal lines, and the third and fourth switching signals may be transferred through third and fourth switching signal lines different from the first and second switching signal lines.

In embodiments, the first sub-pixel may be configured to emit light having a first color, the second and fourth sub-pixels may be configured to emit light having a second color, and the fourth sub-pixel may be configured to emit light having a third color.

In embodiments, the first, second, third and fourth sub-pixels may be located in a first row. The display panel may further include a fifth sub-pixel located in a second row adjacent to the first row, coupled to the first data line, and configured to emit light having the third color, a sixth sub-pixel located in the second row, coupled to the second data line, and configured to emit light having the second color, a seventh sub-pixel located in the second row, coupled to the third data line, and configured to emit light having the first color, and an eighth sub-pixel located in the second row, coupled to the fourth data line, and configured to emit light having the second color.

In embodiments, the first sub-pixel may be a red sub-pixel, the second and fourth sub-pixels may be green sub-pixels, and the fourth sub-pixel may be a blue sub-pixel.

In embodiments, the demultiplexer circuit may include a first switch configured to selectively couple the first output channel to the first data line in response to the first switching signal, a second switch configured to selectively couple the first output channel to the third data line in response to the second switching signal, a third switch configured to selectively couple the second output channel to the second data line in response to the third switching signal, and a fourth switch configured to selectively couple the second output channel to the fourth data line in response to the fourth switching signal.

In embodiments, each of the first and third switching signals may have an on-level in a first period of a horizontal time, and may have an off-level in a second period of the horizontal time. Each of the second and fourth switching signals may have the off-level in the first period of the horizontal time, and may have the on-level in the second period of the horizontal time.

In embodiments, the display device may further include a data comparing circuit configured to calculate a gray level difference between image data for the second sub-pixel and image data for the fourth sub-pixel, and to compare the gray level difference with a reference difference, the first to fourth switching signals controlled based on a result of the comparison.

In embodiments, the first switching signal may have an on-level in a first period of a horizontal time, and may have an off-level in a second period of the horizontal time. The second switching signal may have the off-level in the first period of the horizontal time, and may have the on-level in the second period of the horizontal time. In a case where the gray level difference is greater than the reference difference, the third switching signal may have the on-level in the first period of the horizontal time, and may have the off-level in the second period of the horizontal time, and the fourth switching signal may have the off-level in the first period of the horizontal time, and may have the on-level in the second period of the horizontal time. In a case where the gray level difference is less than or equal to the reference difference, each of the third and fourth switching signals may have the on-level in the first period of the horizontal time, and may have the off-level in the second period of the horizontal time.

In embodiments, in the case where the gray level difference is less than or equal to the reference difference, a same data voltage may be provided to the second sub-pixel and the fourth sub-pixel.

In embodiments, the first switching signal may have an on-level in a first period of a horizontal time, and may have an off-level in a second period of the horizontal time. The second switching signal may have the off-level in the first period of the horizontal time, and may have the on-level in the second period of the horizontal time. In a case where the gray level difference is greater than the reference difference, the third switching signal may have the on-level in the first period of the horizontal time, and may have the off-level in the second period of the horizontal time, and the fourth switching signal may have the off-level in the first period of the horizontal time, and may have the on-level in the second period of the horizontal time. In a case where the gray level difference is less than or equal to the reference difference, the third switching signal may have the on-level in at least a portion of the horizontal time, and the fourth switching signal may have the off-level in the entire horizontal time.

In embodiments, in the case where the gray level difference is less than or equal to the reference difference, within the horizontal time, a time length of a period in which the third switching signal has the on-level may be longer than a time length of a period in which each of the first and second switching signals has the on-level.

In embodiments, in the case where the gray level difference is less than or equal to the reference difference, a data voltage may be provided to the second sub-pixel, and no data voltage may be provided to the fourth sub-pixel.

In embodiments, in a case where the gray level difference is less than or equal to the reference difference, the third switching signal may have an on-level in at least a portion of a horizontal time of a first frame period, and may have an off-level in an entire horizontal time of a second frame period, and the fourth switching signal may have the off-level in the entire horizontal time of the first frame period, and may have the on-level in at least a portion of the horizontal time of the second frame period.

In embodiments, in the case where the gray level difference is less than or equal to the reference difference, in the first frame period, a first data voltage for the second sub-pixel may be provided to the second sub-pixel, and no data voltage may be provided to the fourth sub-pixel. In the second frame period, no data voltage may be provided to the second sub-pixel, and a second data voltage for the fourth sub-pixel may be provided to the fourth sub-pixel.

In embodiments, the first, second, third and fourth sub-pixels may be located in a first row, and the display panel may further include fifth, sixth, seventh and eighth sub-pixels located in a second row adjacent to the first row. In a case where the gray level difference between the second and fourth sub-pixels is less than or equal to the reference difference, the third switching signal may have an on-level in at least a portion of a first horizontal time for the first row, and the fourth switching signal may have an off-level in the entire first horizontal time. In a case where the gray level difference between the sixth and eighth sub-pixels is less than or equal to the reference difference, the third switching signal may have the off-level in an entire second horizontal time for the second row, and the fourth switching signal may have the on-level in at least a portion of the second horizontal time.

In embodiments, in the case where the gray level difference between the second and fourth sub-pixels is less than or equal to the reference difference, a first data voltage for the second sub-pixel may be provided to the second sub-pixel, and no data voltage may be provided to the fourth sub-pixel. In the case where the gray level difference between the sixth and eighth sub-pixels is less than or equal to the reference difference, no data voltage may be provided to the sixth sub-pixel, and a second data voltage for the eighth sub-pixel may be provided to the eighth sub-pixel.

In embodiments, the first, second, third and fourth sub-pixels may be located in a first row, and wherein the display panel may further include fifth, sixth, seventh and eighth sub-pixels located in a second row adjacent to the first row. In a case where the gray level difference between the second and fourth sub-pixels is less than or equal to the reference difference, the third switching signal may have an on-level in at least a portion of a first horizontal time of a first frame period, and may have an off-level in an entire first horizontal time of a second frame period, and the fourth switching signal may have the off-level in the entire first horizontal time of the first frame period, and may have the on-level in at least a portion of the first horizontal time of the second frame period. In a case where the gray level difference between the sixth and eighth sub-pixels is less than or equal to the reference difference, the third switching signal may have the off-level in an entire second horizontal time of the first frame period, and may have the on-level in at least a portion of a second horizontal time of the second frame period, and the fourth switching signal may have the on-level in at least a portion of the second horizontal time of the first frame period, and may have the off-level in the entire second horizontal time of the second frame period.

In embodiments, in a case where the gray level difference between the second and fourth sub-pixels is less than or equal to the reference difference, and the gray level difference between the sixth and eighth sub-pixels is less than or equal to the reference difference, in the first frame period, a first data voltage for the second sub-pixel may be provided to the second sub-pixel, no data voltage may be provided to the fourth sub-pixel, no data voltage may be provided to the sixth sub-pixel, and a second data voltage for the eighth sub-pixel may be provided to the eighth sub-pixel. In the second frame period, no data voltage may be provided to the second sub-pixel, a third data voltage for the fourth sub-pixel may be provided to the fourth sub-pixel, a fourth data voltage for the sixth sub-pixel may be provided to the sixth sub-pixel, and no data voltage may be provided to the eighth sub-pixel.

According to some embodiments, there is provided a display device including a display panel including N data lines, red and blue sub-pixels coupled to (4M+1)-th and (4M+3)-th data lines among the N data lines, and green sub-pixels coupled to (4M+2)-th and (4M+4)-th data lines among the N data lines, where N is a multiple of 4, and M is an integer greater than or equal to 0 and less than N/4, a data driver including N/2 output channels, and a demultiplexer circuit configured to selectively couple at least one of the (4M+1)-th data line and the (4M+3)-th data line to a (2M+1)-th output channel among the N/2 output channels in response to first and second switching signals, and to selectively couple at least one of the (4M+2)-th data line and the (4M+4)-th data line to a (2M+2)-th output channel among the N/2 output channels in response to third and fourth switching signals different from the first and second switching signals.

As described above, in a display device according to embodiments, a demultiplexer circuit may selectively couple at least one of a first data line and a third data line to a first output channel of a data driver in response to first and second switching signals, and may selectively couple at least one of a second data line and a fourth data line to a second output channel of the data driver in response to third and fourth switching signals different from the first and second switching signals. Accordingly, the number of output channels of the data driver may be reduced, power consumption of the data driver and the display device may be reduced, and a demultiplexing operation may be efficiently performed. Further, data voltages may be provided to sub-pixels (e.g., green sub-pixels) coupled to the second and fourth data lines in a manner different from a manner in which data voltages are provided to sub-pixels (e.g., red and blue sub-pixels) coupled to the first and third data lines.

In accordance with one or more embodiments, a display device includes a display panel including sub-pixels in an RGBG arrangement; and a demultiplexer configured to apply data voltages to the sub-pixels, wherein the demultiplexer includes switches configured to selectively couple output channels of a data driver to the sub-pixels. The switches include a first switch coupled to a red sub-pixel, a second switch coupled to a sub-blue pixel, a third switch coupled to a first green sub-pixel, and a fourth switch coupled to a second green sub-pixel, wherein the red sub-pixel, the blue sub-pixel, the first green sub-pixel, and the second green sub-pixel are disposed in a same row of the display panel.

The first switch may couple a first output channel of the data driver to the red sub-pixel, the second switch may couple the first output channel to the blue sub-pixel, the third switch may couple a second output channel of the data driver to the first green sub-pixel, and the fourth switch may couple the second output channel to the second green sub-pixel.

The first switch may be on in a first period of a horizontal time and off in a second period of the horizontal time, and the second switch may be off in the first period and on in the second period. The third switch may be on in the first period and off in the second period, and the fourth switch may be off in the first period and on in the second period.

When a difference between gray levels of the first green sub-pixel and the second green sub-pixel is less than or equal to a reference difference, the third switch may be on in the first period and off in the second period, the fourth switch may be on in the first period and off in the second period. In this case, the demultiplexer may be configured to apply a same voltage to the first green sub-pixel and the second green sub-pixel in the first period and to apply no data voltage to the first green sub-pixel and the second green sub-pixel in the second period.

When a difference between gray levels of the first green sub-pixel and the second green sub-pixel is less than or equal to a reference difference, the third switch may be on in the first period and on in a first portion of the second period and off in a second portion of the second period, to apply a voltage to the first green sub-pixel, and the fourth switch may be off in the first period and the second period such that no voltage is applied to the second green sub-pixel.

BRIEF DESCRIPTION OF THE DRAWINGS

Illustrative, non-limiting embodiments will be more clearly understood from the following detailed description taken in conjunction with the accompanying drawings.

FIG. 6 is a diagram for describing an example of data voltages provided to sub-pixels according to embodiments.

FIG. 8 is a diagram for describing an example of data voltages provided to sub-pixels according to embodiments.

FIG. 10 is a diagram for describing an example of data voltages provided to sub-pixels according to embodiments.

FIG. 12 is a diagram for describing an example of data voltages provided to sub-pixels according to embodiments.

FIG. 14 is a diagram for describing an example of data voltages provided to sub-pixels according to embodiments.

DESCRIPTION OF EMBODIMENTS

Figure 1:
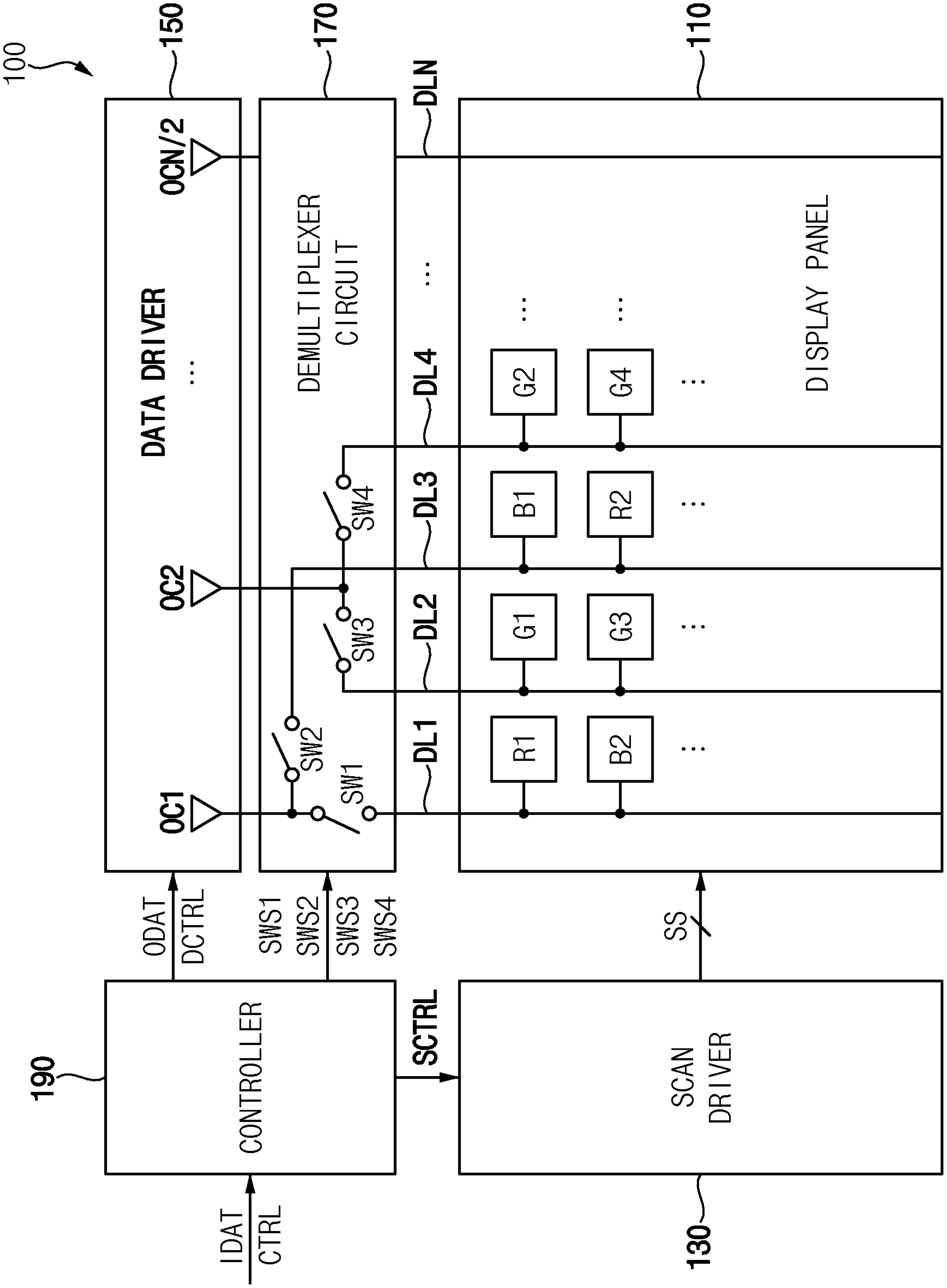
FIG. 1 is a block diagram illustrating a display device according to embodiments.

The embodiments are described more fully hereinafter with reference to the accompanying drawings. Like or similar reference numerals refer to like or similar elements throughout.

Figure 2:
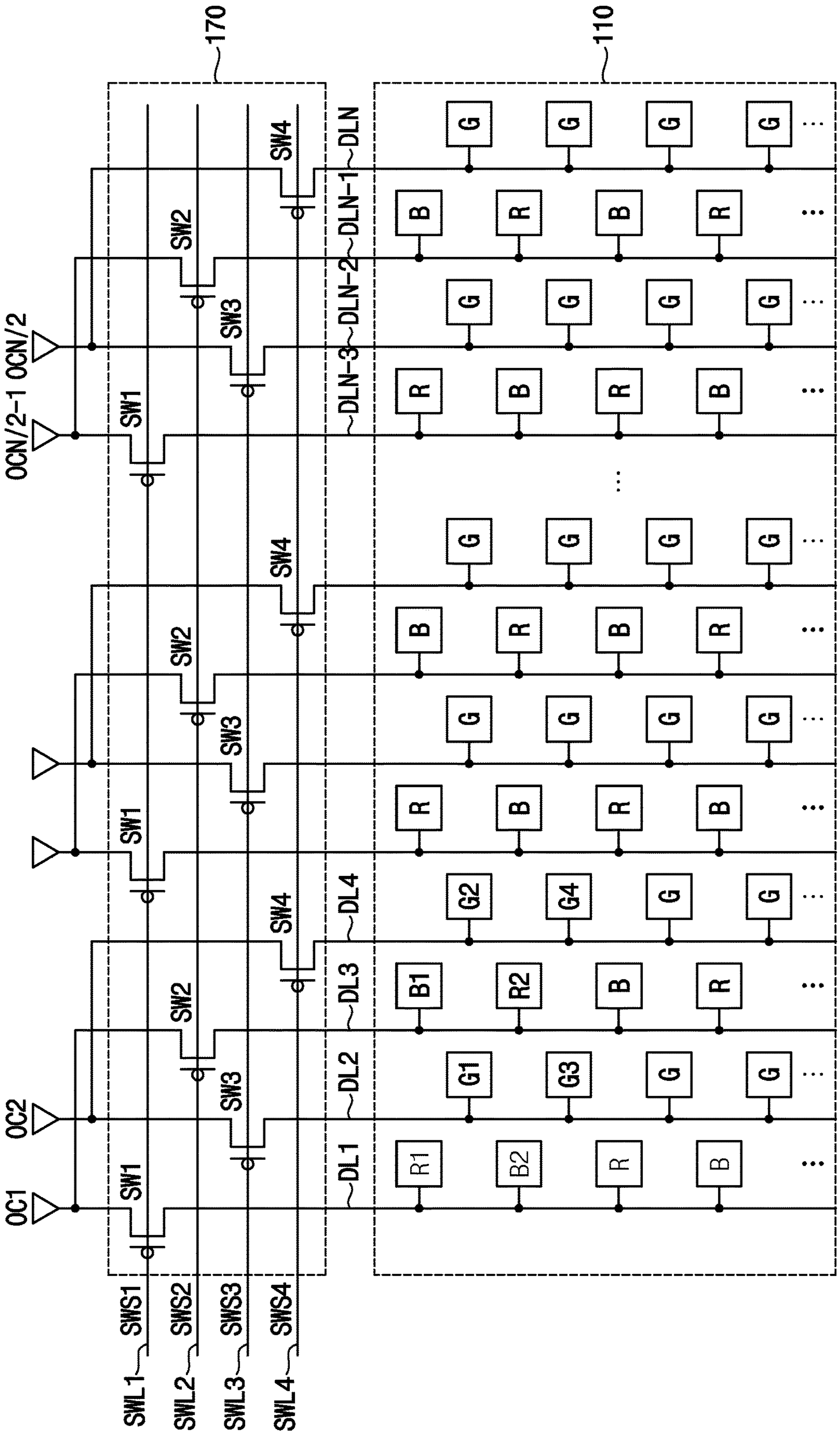
FIG. 2 is a diagram illustrating an example of a display panel and a demultiplexer circuit according to embodiments.
Figure 3:
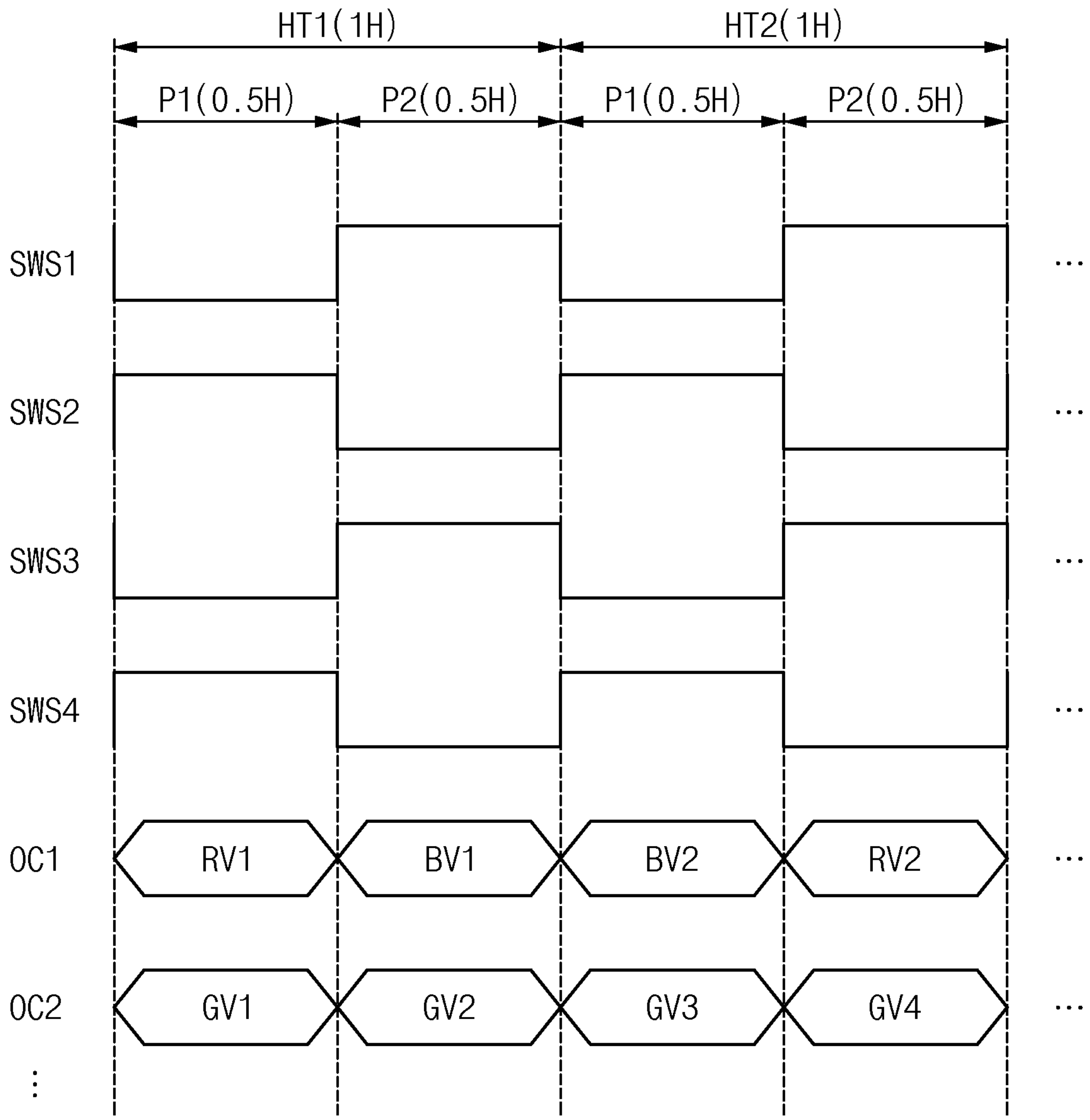
FIG. 3 is a timing diagram for describing an example of an operation of a demultiplexer circuit according to embodiments.

FIG. 1 is a block diagram illustrating a display device 100 according to embodiments, FIG. 2 is a diagram illustrating an example of a display panel 110 and a demultiplexer circuit 170 according to embodiments, and FIG. 3 is a timing diagram for describing an example of an operation of a demultiplexer circuit according to embodiments. In accordance with one or more embodiments, it is to be understood that each pixel of the display panel includes a plurality of sub-pixels having a predetermined arrangement, for example, as indicated below. Referring to FIG. 1, the display device 100 according to embodiments may include display panel 110 having an RGBG arrangement of sub-pixels. This arrangement includes sub-pixels R1, G1, B1, G2, B2, G3, R2, G4, . . . . The display device 100 also includes a scan driver 130 that provides scan signals SS to the sub-pixels R1, G1, B1, G2, B2, G3, R2, G4, . . . , a data driver 150 that provides data voltages to the sub-pixels R1, G1, B1, G2, B2, G3, R2, G4, . . . , a demultiplexer circuit (or more simply, a demultiplexer) 170 that selectively couples data lines DL1, DL2, DL3, DL4, . . . , DLN to output channels OC1, OC2, . . . , OCN, and a controller 190 that controls the scan driver 130, the data driver 150 and the demultiplexer circuit 170.

The display panel 110 may include the data lines DL1, DL2, DL3, DL4, . . . , DLN, scan lines, and the sub-pixels R1, G1, B1, G2, B2, G3, R2, G4, . . . , coupled thereto. In some embodiments, each sub-pixel R1, G1, B1, G2, B2, G3, R2, G4, . . . , may include a light emitting element, and the display panel 110 may be a light emitting display panel. The light emitting element may be, but is not limited to, an organic light emitting diode (OLED). For example, the light emitting element may be a nano light emitting diode (NED), a quantum dot (QD) light emitting diode, a micro light emitting diode, an inorganic light emitting diode, or another suitable light emitting element. However, the display panel 110 is not limited to the light emitting display panel and may be any suitable display panel.

In some embodiments, as indicated above, the display panel 110 may have an RGBG pixel arrangement structure. For example, as illustrated in FIGS. 1 and 2, in the display panel 110, a red sub-pixel R1 and R, a green sub-pixel G1 and G, a blue sub-pixel B1 and B and a green sub-pixel G2 and G may be sequentially and repeatedly arranged in each odd-numbered row, and a blue sub-pixel B2 and B, a green sub-pixel G3 and G, a red sub-pixel R2 and R and a green sub-pixel G4 and G may be sequentially and repeatedly arranged in each even-numbered row. In some embodiments, the display panel 110 may include N data lines DL1, DL2, DL3, DL4, . . . , DLN−3, DLN−2, DLN−1 and DLN, where N is a multiple of 4. Further, the red and blue sub-pixels R1, R2, R, B1, B2 and B may be coupled to (4M+1)-th and (4M+3)-th data lines DL1, DL3, . . . , DLN−3 and DLN−1 (or odd-numbered data lines), and the green sub-pixels G1, G2, G3, G4 and G may be coupled to (4M+2)-th and (4M+4)-th data lines DL2, DL4, . . . , DLN−2 and DLN (or even-numbered data lines), where M is an integer greater than or equal to 0 and less than N/4.

For example, as illustrated in FIG. 2, in a first row of the display panel 110, a first sub-pixel R1 coupled to a first data line DL1 may be a red sub-pixel that emits red light, a second sub-pixel G1 coupled to a second data line DL2 may be a green sub-pixel that emits green light, a third sub-pixel B1 coupled to a third data line DL3 may be a blue sub-pixel that emits blue light, and a fourth sub-pixel G2 coupled to a fourth data line DL4 may be a green sub-pixel that emits green light.

Further, in a second row of the display panel 110 adjacent to the first row, a fifth sub-pixel B2 coupled to the first data line DL1 may be a blue sub-pixel that emits blue light, a sixth sub-pixel G3 coupled to the second data line DL2 may be a green sub-pixel that emits green light, a seventh sub-pixel R2 coupled to the third data line DL3 may be a red sub-pixel that emits red light, and an eighth sub-pixel G4 coupled to the fourth data line DL4 may be a green sub-pixel that emits green light. In another embodiment, the sub-pixels may be arranged so that the arrangement of sub-pixels in the second row are provided in the first row, and the arrangement of sub-pixels in the first row are provided in the second row.

Further, in some embodiments, as illustrated in FIG. 2, one red light emitting element (e.g., R2), two green light emitting elements (e.g., G1 and G2) and one blue light emitting element (e.g., B1) that are adjacent to each other may be arranged in a diamond shape, but the arrangement of sub-pixels may be arranged in different shapes in other embodiments. In the display panel 110 having the RGBG pixel arrangement structure, each pixel may have two sub-pixels including one green sub-pixel (e.g., G1) and one red or blue sub-pixel (e.g., R1). Thus, pixel size may be reduced and thus resolution of the display panel 110 may be increased.

The scan driver 130 may generate scan signals SS based on a scan control signal SCTRL received from the controller 190, and may provide the scan signals SS to the sub-pixels R1, G1, B1, G2, B2, G3, R2, G4, . . . through the scan lines. In some embodiments, the scan control signal SCTRL may include, but is not limited to, a scan start signal and a scan clock signal. Further, in some embodiments, the scan driver 130 may be formed or integrated in a display region or a peripheral region of the display panel 110. In other embodiments, the scan driver 130 may be implemented with one or more integrated circuits.

The data driver 150 may generate data voltages based on output image data ODAT and a data control signal DCTRL received from the controller 190. The data voltages may be provided to the sub-pixels R1, G1, B1, G2, B2, G3, R2, G4, . . . through corresponding ones of the data lines DL1, DL2, DL3, DL4, . . . , DLN. In some embodiments, the data control signal DCTRL may include, but is not limited to, an output data enable signal, a horizontal start signal and a load signal.

Further, the data driver 150 may include output channels OC1, OC2, . . . , OCN/2 that generate and output the data voltages. Each output channel OC1, OC2, . . . , OCN/2 may include, but is not limited to, an output buffer. In some embodiments, the display panel 110 may include the N data lines DL1 through DLN, and the data driver 150 may include N/2 output channels OC1 through OCN/2. In this case, since the number of the output channels OC1 through OCN/2 is less than the number of the data lines DL1 through DLN, the size of the data driver 150 may be reduced, e.g., the number of output channels may be less than the number of columns of sub-pixels in the display panel. In some embodiments, the data driver 150 and the controller 190 may be implemented as a single integrated circuit. Such a single integrated circuit may be referred to as a timing controller embedded data driver (TED). In other embodiments, the data driver 150 and the controller 190 may be implemented with separate integrated circuits.

The demultiplexer circuit 170 may selectively couple the data lines DL1 through DLN to the output channels OC1 through OCN/2 of the data driver 150 in response to switching signals SWS1, SWS2, SWS3 and SWS4. In some embodiments, the demultiplexer circuit 170 may be included in the data driver 150, or may be implemented within an integrated circuit in which the data driver 150 is formed. In other embodiments, the demultiplexer circuit 170 may be formed or integrated in the peripheral region of the display panel 110.

The demultiplexer circuit 170 may selectively couple at least one of the (4M+1)-th data line and the (4M+3)-th data line to a (2M+1)-th output channel of the data driver 150 in response to first and second switching signals SWS1 and SWS2. In addition, the demultiplexer circuit 170 may selectively couple at least one of the (4M+2)-th data line and the (4M+4)-th data line to a (2M+2)-th output channel of the data driver 150 in response to third and fourth switching signals SWS3 and SWS4 different from the first and second switching signals SWS1 and SWS2. Further, in some embodiments, as illustrated in FIG. 2, the first and second switching signals SWS1 and SWS2 may be transferred through first and second switching signal lines SWL1 and SWL2, and the third and fourth switching signals SWS3 and SWS4 may be transferred through third and fourth switching signal lines SWL3 and SWL4 different from the first and second switching signal lines SWL1 and SWL2.

Thus, to efficiently perform a demultiplexing operation, the demultiplexer circuit 170 may perform the demultiplexing operation for the (4M+1)-th and (4M+3)-th data lines to which the red and blue sub-pixels R1, R2, R, B1, B2 and B are coupled in response to the first and second switching signals SWS1 and SWS2. In addition, the demultiplexer circuit 170 may perform the demultiplexing operation for the (4M+2)-th and (4M+4)-th data lines to which the green sub-pixels G1, G2, G3, G4 and G are coupled in response to the third and fourth switching signals SWS3 and SWS4 different from the first and second switching signals SWS1 and SWS2.

In some embodiments, as illustrated in FIG. 2, the demultiplexer circuit 170 may include first switches SW1 that selectively couple the (4M+1)-th output channel to the (2M+1)-th data line in response to the first switching signal SWS1 of the first switching signal line SWL1, second switches SW2 that selectively couple the (4M+3)-th output channel to the (2M+1)-th data line in response to the second switching signal SWS2 of the second switching signal line SWL2, third switches SW3 that selectively couple the (4M+2)-th output channel to the (2M+2)-th data line in response to the third switching signal SWS3 of the third switching signal line SWL3, and fourth switches SW4 that selectively couple the (4M+4)-th output channel to the (2M+2)-th data line in response to the fourth switching signal SWS4 of the first switching signal line SWL4.

For example, in a case where the first switching signal SWS1 has an on-level (e.g., a low level for PMOS switches), the first switches SW1 may couple the first data line DL1 to a first output channel OC1 and may couple a (N−3)-th data line DLN−3 to a (N/2-1)-th output channel OCN/2-1. In a case where the second switching signal SWS2 has the on-level, the second switches SW2 may couple the third data line DL3 to the first output channel OC1, and may couple a (N−1)-th data line DLN−1 to the (N/2-1)-th output channel OCN/2-1. In a case where the third switching signal SWS3 has the on-level, the third switches SW3 may couple the second data line DL3 to a second output channel OC2, and may couple a (N−2)-th data line DLN−2 to a (N/2)-th output channel OCN/2. In a case where the fourth switching signal SWS4 has the on-level, the fourth switches SW4 may couple the fourth data line DL4 to the second output channel OC2, and may couple an N-th data line DLN to the (N/2)-th output channel OCN/2. The switches may be implemented using NMOS technology in another embodiment.

In some embodiments, the demultiplexer circuit 170 may sequentially couple two data lines (e.g., the first and third data lines DL1 and DL3) to one output channel (e.g., the first output channel OC1) within each horizontal time. Here, the horizontal time may be a time allocated to one row of the display panel 110, and, for example, may correspond to a time determined by dividing the time of one frame period by the number of rows of the display panel 110.

For example, as illustrated in FIG. 3, one horizontal time 1H may be divided into a first period P1 and a second period P2. Each of the first period P1 and the second period P2 may correspond to a half 0.5H of the horizontal time. In the first period P1 of a first horizontal time HT1 allocated to the first row of the display panel 110, the first output channel OC1 may output the data voltage RV1 for the first sub-pixel R1, and the second output channel OC2 may output the data voltage GV1 for the second sub-pixel G1.

Further, in the first period P1 of the first horizontal time HT1, each of the first and third switching signals SWS1 and SWS3 may have the on-level (e.g., low level for PMOS switches), and each of the second and fourth switching signals SWS2 and SWS4 may have an off-level (e.g., high level for PMOS switches). Thus, the first switch SW1 may couple the first data line DL1 to the first output channel OC1 in response to the first switching signal SWS1 having the on-level, and the data voltage RV1 may be provided to the first sub-pixel R1 coupled to the first data line DL1. Further, the third switch SW3 may couple the second data line DL2 to the second output channel OC2 in response to the third switching signal SWS3 having the on-level, and the data voltage GV1 may be provided to the second sub-pixel G1 coupled to the second data line DL2.

Further, in the second period P2 of the first horizontal time HT1, the first output channel OC1 may output the data voltage BV1 for the third sub-pixel B1, and the second output channel OC2 may output the data voltage GV2 for the fourth sub-pixel G2. Further, in the second period P2 of the first horizontal time HT1, each of the first and third switching signals SWS1 and SWS3 may have the off-level, and each of the second and fourth switching signals SWS2 and SWS4 may have the on-level. Thus, the second switch SW2 may couple the third data line DL3 to the first output channel OC1 in response to the second switching signal SWS2 having the on-level, and the data voltage BV1 may be provided to the third sub-pixel B1 coupled to the third data line DL3. Further, the fourth switch SW4 may couple the fourth data line DL4 to the second output channel OC2 in response to the fourth switching signal SWS4 having the on-level, and the data voltage GV2 may be provided to the fourth sub-pixel G2 coupled to the fourth data line DL4.

In the first period P1 of a second horizontal time HT2 allocated to the second row of the display panel 110, the first output channel OC1 may output the data voltage BV2 for the fifth sub-pixel B2, and the second output channel OC2 may output the data voltage GV3 for the sixth sub-pixel G3. Further, in the first period P1 of the second horizontal time HT2, each of the first and third switching signals SWS1 and SWS3 may have the on-level, and each of the second and fourth switching signals SWS2 and SWS4 may have the off-level.

Thus, the first switch SW1 may couple the first data line DL1 to the first output channel OC1 in response to the first switching signal SWS1 having the on-level, and the data voltage BV2 may be provided to the fifth sub-pixel B2 coupled to the first data line DL1. Further, the third switch SW3 may couple the second data line DL2 to the second output channel OC2 in response to the third switching signal SWS3 having the on-level, and the data voltage GV3 may be provided to the sixth sub-pixel G3 coupled to the second data line DL2.

Further, in the second period P2 of the second horizontal time HT2, the first output channel OC1 may output the data voltage RV2 for the sixth sub-pixel R2, and the second output channel OC2 may output the data voltage GV4 for the eighth sub-pixel G4. Further, in the second period P2 of the second horizontal time HT2, each of the first and third switching signals SWS1 and SWS3 may have the off-level, and each of the second and fourth switching signals SWS2 and SWS4 may have the on-level.

Thus, the second switch SW2 may couple the third data line DL3 to the first output channel OC1 in response to the second switching signal SWS2 having the on-level, and the data voltage GV2 may be provided to the seventh sub-pixel R2 coupled to the third data line DL3. Further, the fourth switch SW4 may couple the fourth data line DL4 to the second output channel OC2 in response to the fourth switching signal SWS4 having the on-level, and the data voltage GV4 may be provided to the eighth sub-pixel G4 coupled to the fourth data line DL4.

The controller 190 (e.g., a timing controller (T-CON)) may receive input image data IDAT and a control signal CTRL from an external host processor (e.g., an application processor (AP), a graphics processing unit (GPU) or a graphics card). In some embodiments, the control signal CTRL may include, but is not limited to, a vertical synchronization signal, a horizontal synchronization signal, an input data enable signal and a master clock signal. The controller 190 may generate the output image data ODAT, the data control signal DCTRL, the scan control signal SCTRL and the switching signals SWS1, SWS2, SWS3 and SWS4 based on the input image data IDAT and the control signal CTRL. The controller 190 may control the scan driver 130 by providing the scan control signal SCTRL to the scan driver 130, may control the data driver 150 by providing the output image data ODAT and the data control signal DCTRL to the data driver 150, and may control the demultiplexer circuit 170 by providing the switching signals SWS1, SWS2, SWS3 and SWS4 to the demultiplexer circuit 170. The switching signals control the demultiplexer circuit 170 to output data voltages to corresponding ones of the sub-pixel in accordance with the embodiments described in greater detail below.

As described above, in the display device 100 according to embodiments, the number of the output channels OC1 through OCN/2 of the data driver 150 may be less than the number of the data lines DL1 through DLN. Accordingly, the size of the data driver 150 may be reduced. Further, in the display device 100 according to embodiments, (2M+1)-th output channels (or odd-numbered output channels) of the data driver 150 may output the data voltages RV1, BV1, BV2, RV2, . . . , only for corresponding ones of the red and blue sub-pixels R1, R2, R, B1, B2 and B, and (2M+2)-th output channels (or even-numbered output channels) of the data driver 150 may output the data voltages GV1, GV2, GV3, GV4, . . . , only for corresponding ones of the green sub-pixels G1, G2, G3, G4 and G.

Further, the demultiplexer circuit 170 may perform the demultiplexing operation for the (4M+1)-th and (4M+3)-th (odd-numbered) data lines to which the red and blue sub-pixels R1, R2, R, B1, B2 and B are coupled in response to the first and second switching signals SWS1 and SWS2, and may perform the demultiplexing operation for the (4M+2)-th and (4M+4)-th (even-numbered) data lines to which the green sub-pixels G1, G2, G3, G4 and G are coupled in response to the third and fourth switching signals SWS3 and SWS4 different from the first and second switching signals SWS1 and SWS2. Accordingly, in the display device 100 according to embodiments, power consumption may be reduced, and the demultiplexing operation may be efficiently performed.

Figure 4:
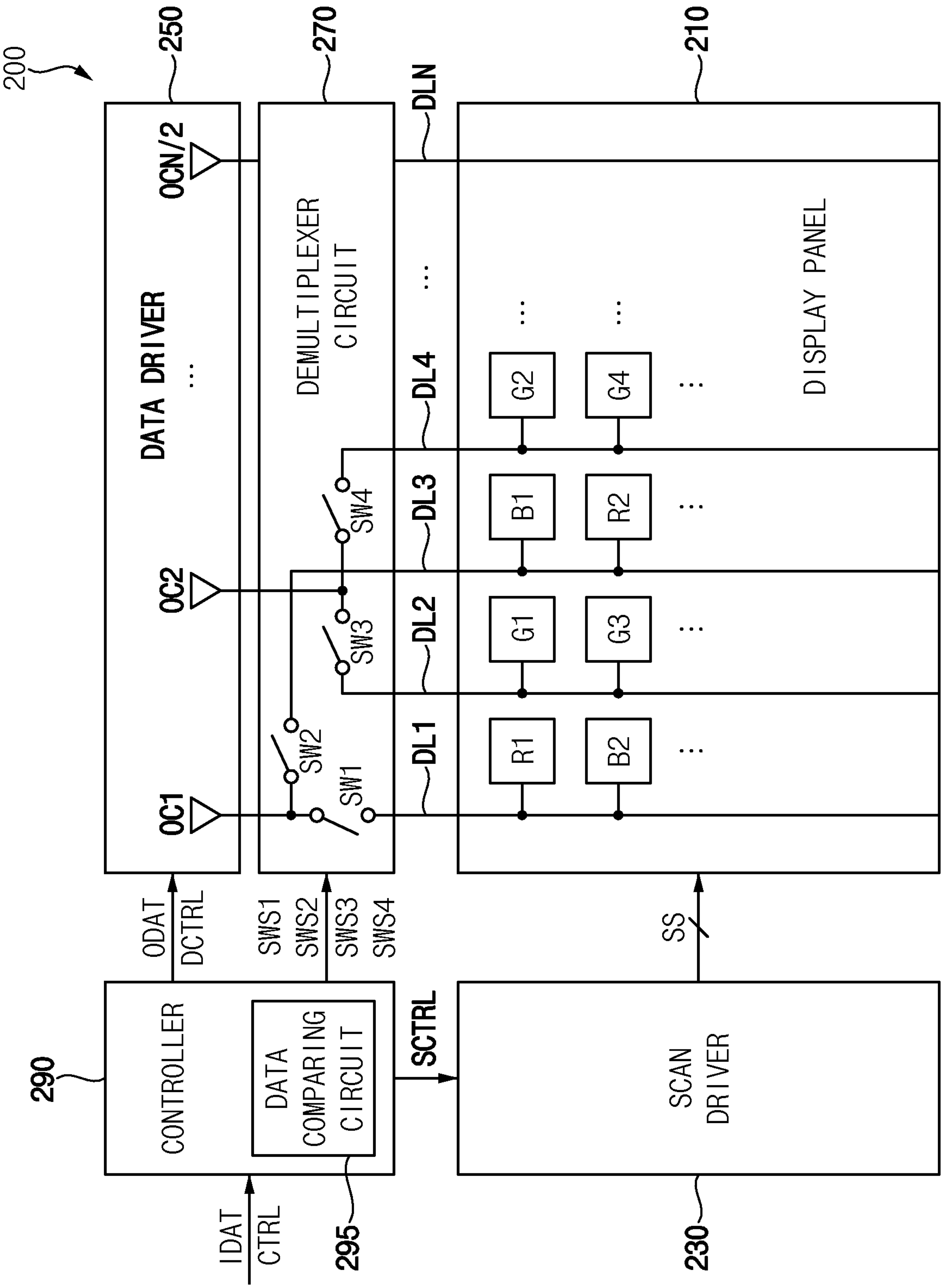
FIG. 4 is a block diagram illustrating a display device according to embodiments.
Figure 5:
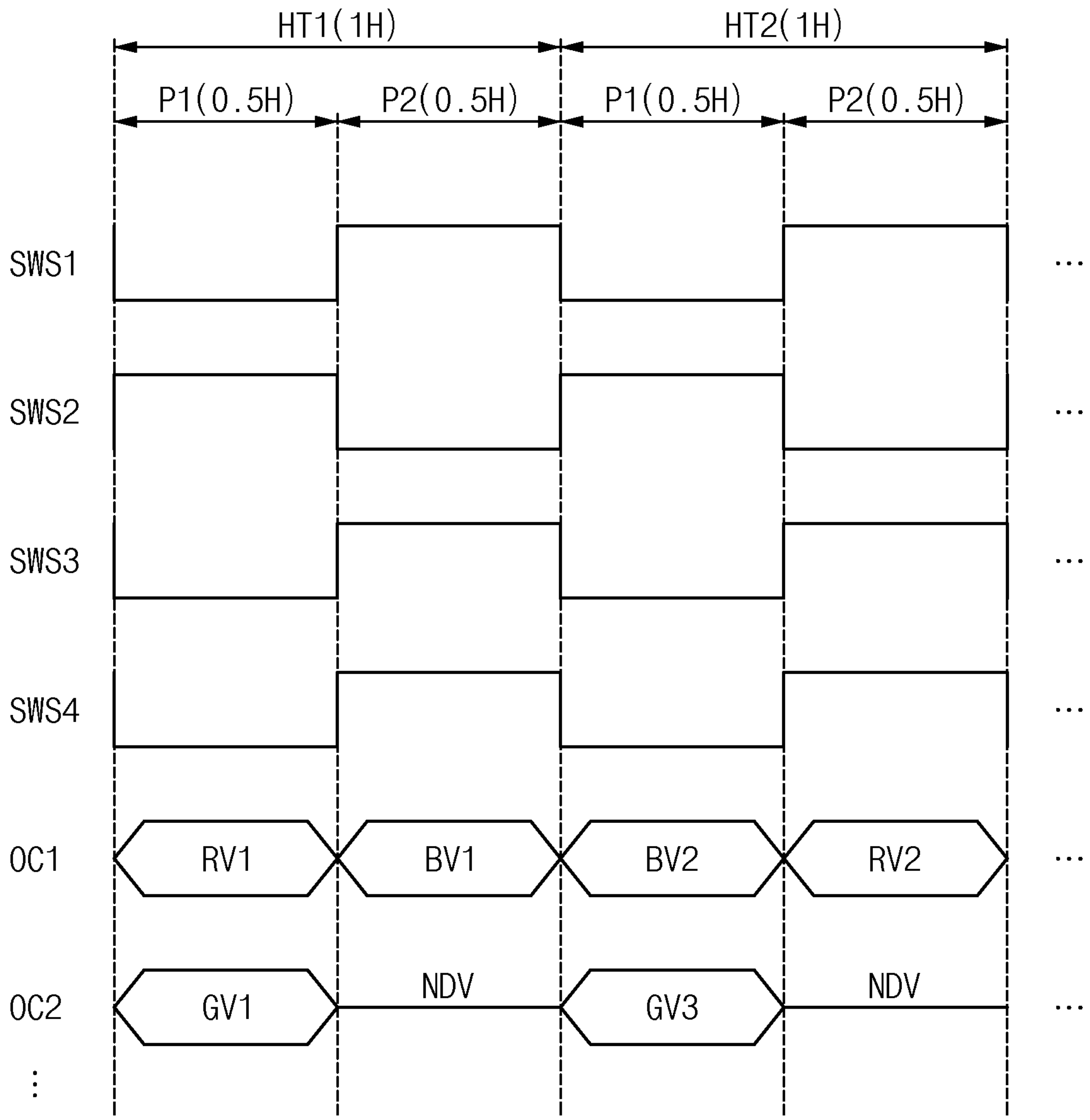
FIG. 5 is a timing diagram for describing an example of an operation of a demultiplexer circuit according to embodiments.

FIG. 4 is a block diagram illustrating a display device 200 according to embodiments, FIG. 5 is a timing diagram for describing an example of an operation of a demultiplexer circuit 270 according to embodiments, and FIG. 6 is a diagram for describing an example of data voltages provided to sub-pixels according to embodiments.

Referring to FIG. 4, the display device 200 according to embodiments may include a display panel 210, a scan driver 230, a data driver 250, a demultiplexer circuit 270, a controller 290, and a data comparing circuit (comparator) 295. The display device 200 of FIG. 4 may have a configuration and operation similar to a display device 100 of FIG. 1.

The data comparing circuit 295 may calculate a gray level difference between two adjacent (or consecutive) green sub-pixels, and may compare the gray level difference with a reference difference. For example, the data comparing circuit 295 may calculate a gray level difference between image data for a second sub-pixel G1 and image data for a fourth sub-pixel G2, and may compare the gray level difference with the reference difference. In some embodiments, the reference difference may correspond to, but is not limited to, a 2-gray level.

The display device 200 may sequentially provide data voltages to each pair of adjacent (or consecutive) red and blue sub-pixels (e.g., R1 and B1) in a time division manner in each horizontal time. Further, in a case where any one of a plurality of pairs of two adjacent (or consecutive) green sub-pixels (e.g., G1 and G2) in a same row of the display panel 210 has a gray level difference greater than the reference difference, the display device 200 may sequentially provide data voltages to each pair of the adjacent green sub-pixels in the row in the time division manner in each horizontal time. However, in a case where all of the pairs of the adjacent two green sub-pixels in the row have gray level differences less than or equal to the reference difference, the display device 200 may provide the same data voltage to each pair of the adjacent green sub-pixels in the row.

For example, as illustrated in FIGS. 3 and 5, a first switching signal SWS1 may have an on-level in a first period P1 of each horizontal time HT1 and HT2, and a second switching signal SWS2 may have the on-level in a second period P2 of each horizontal time HT1 and HT2. Thus, data voltages RV1 and BV1 may be sequentially provided to first and third sub-pixels R1 and B1 in a first horizontal time HT1, and data voltages BV2 and RV2 may be sequentially provided to fifth and seventh sub-pixels B2 and R2 in a second horizontal time HT2.

Further, in a case where any one of a plurality of pairs of two adjacent (or consecutive) green sub-pixels in a first row of the display panel 210 has a gray level difference greater than the reference difference, and any one of a plurality of pairs of adjacent two green sub-pixels in a second row of the display panel 210 has a gray level difference greater than the reference difference (e.g., as illustrated in FIG. 3), a third switching signal SWS3 may have the on-level in the first period P1 of each of the first and second horizontal times HT1 and HT2 for the first and second rows, and a fourth switching signal SWS4 may have the on-level in the second period P2 of each of the first and second horizontal times HT1 and HT2. Thus, data voltages GV1 and GV2 may be sequentially provided to second and fourth (green) sub-pixels G1 and G2 in the first horizontal time HT1, and data voltages GV3 and GV4 may be sequentially provided to sixth and eighth (green) sub-pixels G3 and G4 in the second horizontal time HT2.

However, in a case where all of the pairs of the adjacent two green sub-pixels in the first row have gray level differences less than or equal to the reference difference, and all of the pairs of the adjacent two green sub-pixels in the second row have gray level differences less than or equal to the reference difference (e.g., as illustrated in FIG. 5), each of the third and fourth switching signals SWS3 and SWS4 may have the on-level in the first period P1 of each of the first and second horizontal times HT1 and HT2, and may have an off-level in the second period P2 of each of the first and second horizontal times HT1 and HT2.

Thus, the same data voltage GV1 may be substantially simultaneously provided to the second and fourth (green) sub-pixels G1 and G2 in the first horizontal time HT1, and the same data voltage GV3 may be substantially simultaneously provided to the sixth and eighth (green) sub-pixels G3 and G4 in the second horizontal time HT2. A second output channel OC2 may output no data voltage NDV in the second period P2 of each of the first and second horizontal times HT1 and HT2. Thus, power consumption of the data driver 250 and the display device 200 may be reduced.

Accordingly, as illustrated in FIG. 6, the data voltages RV1, BV1, BV2 and RV2 corresponding to the first, third, fifth and seventh sub-pixels R1, B1, B2 and R2 may be respectively provided to the first, third, fifth and seventh sub-pixels R1, B1, B2 and R2. However, the same data voltage GV1 may be provided to the second and fourth sub-pixels G1 and G2, and the same data voltage GV3 may be provided to the sixth and eighth sub-pixels G3 and G4.

FIGS. 5 and 6 illustrate an example where a data voltage GV1 for the second sub-pixel G1 is provided to the second and fourth sub-pixels G1 and G2, and a data voltage GV3 for the sixth sub-pixel G3 is provided to the sixth and eighth sub-pixels G3 and G4, the same data voltage provided to adjacent two green sub-pixels is not limited to the example illustrated in FIGS. 5 and 6. For example, an average data voltage (e.g., an average of data voltages GV1 and GV3) may be provided to the adjacent two (consecutive) green sub-pixels.

As described above, in the display device 200 according to embodiments, in a case where all of a plurality of pairs of adjacent two green sub-pixels in each row of the display panel 210 have gray level differences less than or equal to the reference difference, the display device 200 may provide the same data voltage to each pair of the adjacent two green sub-pixels in the row. Accordingly, the power consumption of the display device 200 may be reduced.

Figure 7:
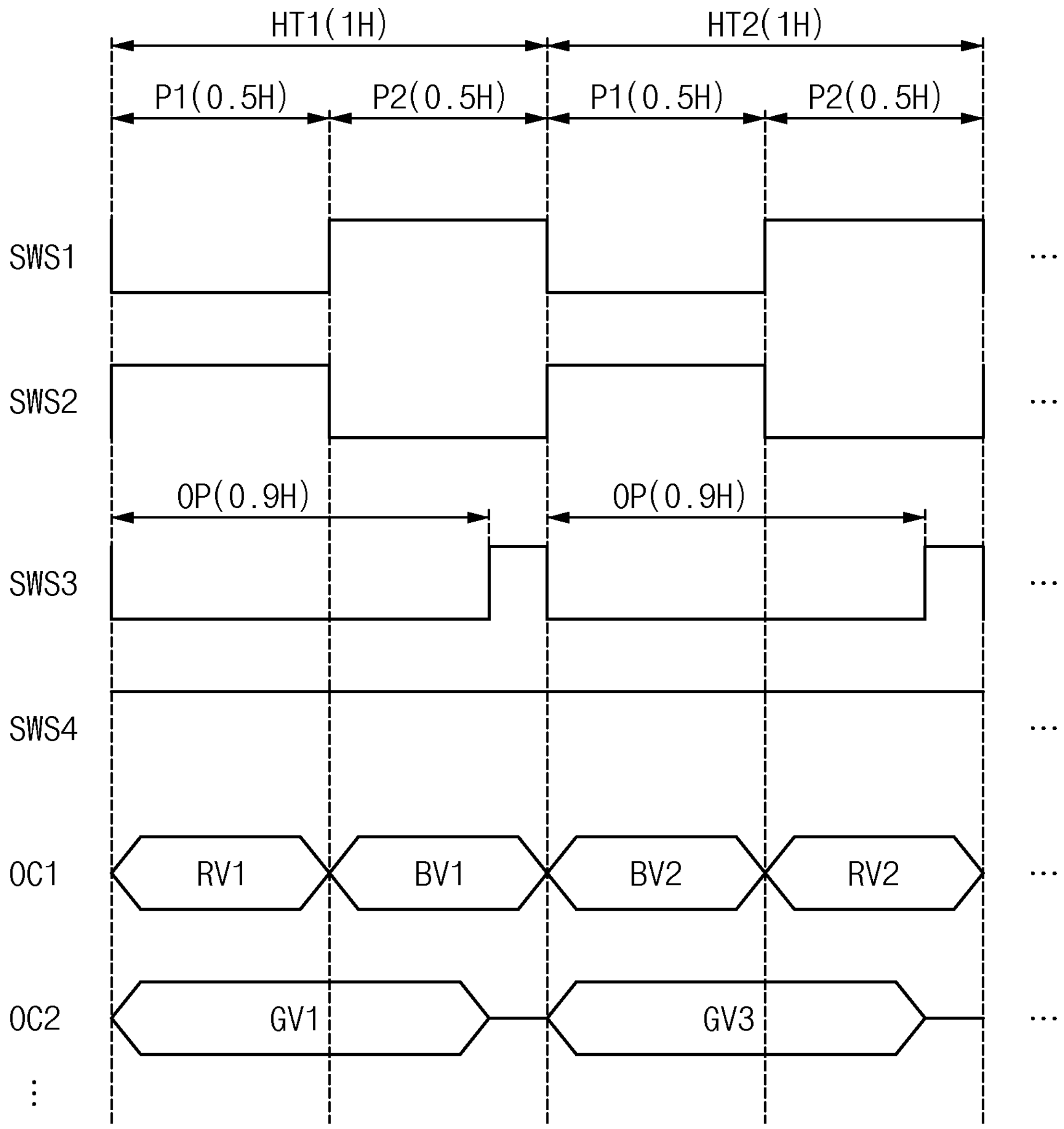
FIG. 7 is a timing diagram for describing an example of an operation of a demultiplexer circuit according to embodiments.

FIG. 7 is a timing diagram for describing an example of an operation of a demultiplexer circuit according to embodiments, and FIG. 8 is a diagram for describing an example of data voltages provided to sub-pixels according to embodiments.

Referring to FIGS. 4 and 7, display device 200 according to embodiments may sequentially provide data voltages to each pair of adjacent red and blue sub-pixels (e.g., R1 and B1) in a time division manner in each horizontal time. Further, in a case where any one of a plurality of pairs of adjacent (consecutive) two green sub-pixels (e.g., G1 and G2) in each row of a display panel 210 has a gray level difference greater than a reference difference, the display device 200 may sequentially provide data voltages to each pair (e.g., both) of the adjacent green sub-pixels in the row in each horizontal time. However, in a case where all of the pairs of the adjacent two green sub-pixels in the row have gray level differences less than or equal to the reference difference, the display device 200 may provide a data voltage to one green sub-pixel of each pair of the adjacent green sub-pixels in the row, and may not provide a data voltage to the other green sub-pixel of each pair of the adjacent green sub-pixels in the row. In some embodiments, a storage capacitor of each sub-pixel may be initialized before a data voltage is provided to the sub-pixel. Thus, in a case where the data voltage is not provided to a sub-pixel, the sub-pixel may not emit light.

For example, in a case where all pairs of adjacent two green sub-pixels in a first row of the display panel 210 have gray level differences less than or equal to the reference difference, and all pairs of adjacent two green sub-pixels in a second row of the display panel 210 have gray level differences less than or equal to the reference difference (e.g., as illustrated in FIG. 7), a third switching signal SWS3 may have an on-level in at least a portion OP of each of first and second horizontal times HT1 and HT2, and a fourth switching signal SWS4 may have an off-level in the entire period of each of the first and second horizontal times HT1 and HT2. As illustrated in FIG. 7, the portion OP may include the entire first period and a portion of the second period of each of the first and second horizontal times HT1 and HT2, as described in greater detail below.

Additionally, in some embodiments, within each horizontal time HT1 and HT2, a time length of a period in which the third switching signal SWS3 has the on-level may be longer than a time length of a period in which each of first and second switching signals SWS1 and SWS2 has the on-level. For example, each of a first period P1 in which the first switching signal SWS1 has the on-level and a second period P2 in which the second switching signal SWS2 has the on-level may have a time length of about 0.5-horizontal time 0.5H, and a period OP in which the third switching signal SWS3 has the on-level may have a time length of about 0.9-horizontal time 0.9H. However, the time length of the period OP in which the third switching signal SWS3 has the on-level is not limited to the 0.9-horizontal time 0.9H, e.g., the time length of the period OP may be less than or greater than 0.9H in other embodiments. Thus, a data voltage GV1 may be provided to a second sub-pixel G1 in the portion OP of the first horizontal time HT1, and a data voltage GV3 may be provided to a sixth sub-pixel G3 in the portion OP of the second horizontal time HT2.

Accordingly, as illustrated in FIG. 8, data voltages RV1, GV1, BV1, BV2, GV3 and RV2 corresponding to first, second, third, fifth, sixth and seventh sub-pixels R1, G1, B1, B2, G3 and R2 may be respectively provided to the first, second, third, fifth, sixth and seventh sub-pixels R1, G1, B1, B2, G3 and R2. However, no data voltage is provided to fourth and eighth sub-pixels G2 and G4. Thus, the fourth and eighth sub-pixels G2 and G4 may not emit light in a frame period in which no data voltage is provided, thereby reducing power consumption.

As described above, in the display device 200 according to embodiments, in a case where all pairs of adjacent two green sub-pixels in each row of the display panel 210 have gray level differences less than or equal to the reference difference, the display device 200 may provide a data voltage to only one green sub-pixel of each pair of the adjacent two green sub-pixels in the row. Accordingly, power consumption of the display device 200 may be reduced.

Figure 9:
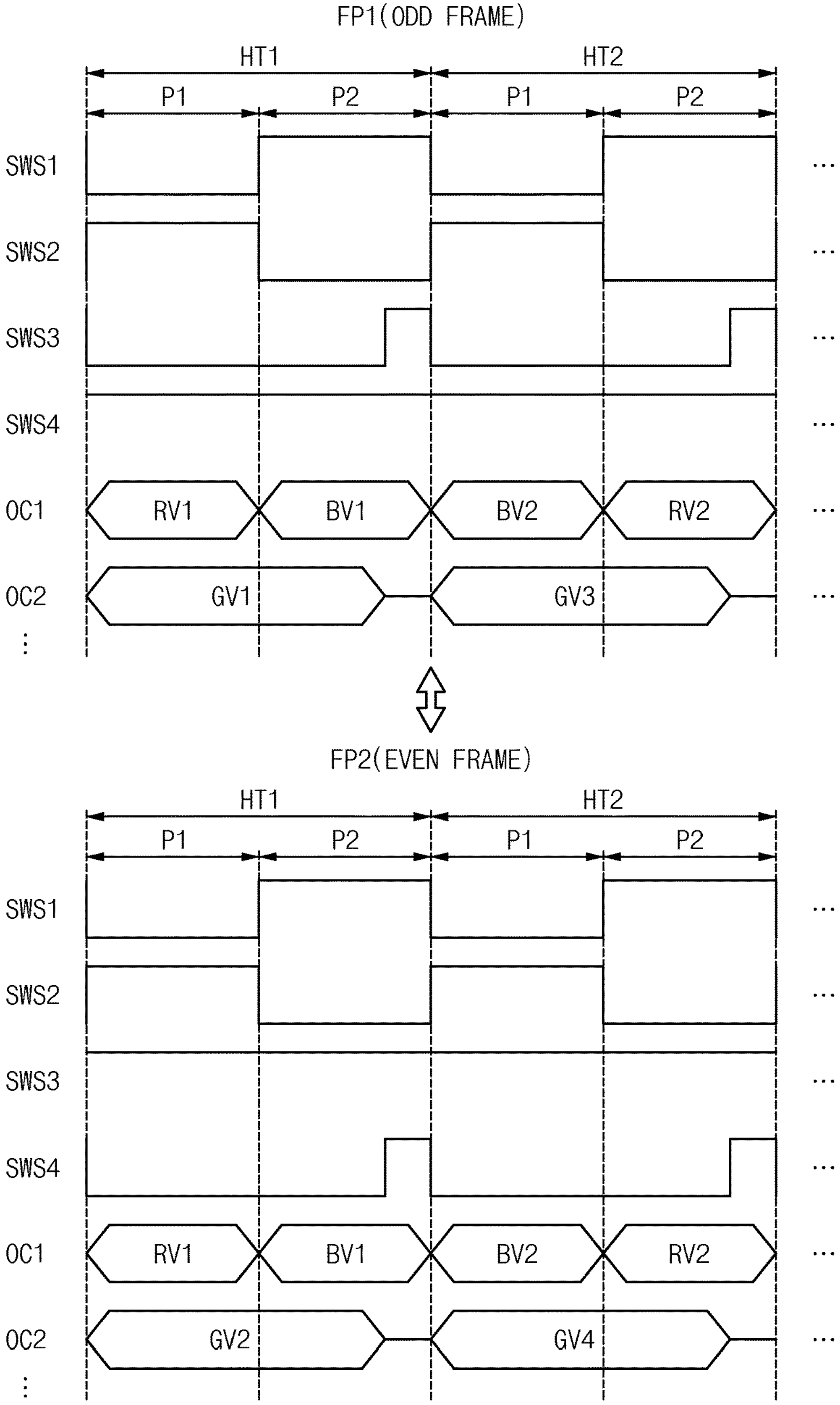
FIG. 9 is a timing diagram for describing an example of an operation of a demultiplexer circuit according to embodiments.

FIG. 9 is a timing diagram for describing an example of an operation of a demultiplexer circuit according to embodiments, and FIG. 10 is a diagram for describing an example of data voltages provided to sub-pixels according to embodiments. The timing diagram illustrated in FIG. 9 may be similar to a timing diagram illustrated in FIG. 7, except that a third switching signal SWS3 has an on-level in a first frame period FP1, and a fourth switching signal SWS4 has the on-level in a second frame period FP2.

Referring to FIGS. 4 and 9, the display device 200 according to embodiments may sequentially provide data voltages to each pair of adjacent red and blue sub-pixels (e.g., R1 and B1) in a time division manner in each horizontal time. Further, in a case where any one of a plurality of pairs of two adjacent (or consecutive) green sub-pixels (e.g., G1 and G2) in each row of a display panel 210 has a gray level difference greater than a reference difference, the display device 200 may sequentially provide data voltages to both sub-pixels in each pair of the adjacent green sub-pixels in the row in each horizontal time. However, in a case where all pairs of the adjacent two green sub-pixels in the row have gray level differences less than or equal to the reference difference, the display device 200 may provide a data voltage to one green sub-pixel of each pair of the adjacent green sub-pixels in the row in the first frame period FP1 (e.g., an odd-numbered frame period), and may provide a data voltage to the other green sub-pixel of each pair of the adjacent green sub-pixels in the row in the second frame period FP2 (e.g., an even-numbered frame period).

For example, in a case where all pairs of adjacent two green sub-pixels in a first row of the display panel 210 have gray level differences less than or equal to the reference difference, and all pairs of adjacent two green sub-pixels in a second row of the display panel 210 have gray level differences less than or equal to the reference difference (e.g., as illustrated in FIG. 9), the third switching signal SWS3 may have the on-level in at least a portion of each of first and second horizontal times HT1 and HT2 of the first frame period FP1, and the fourth switching signal SWS4 may have the on-level in at least a portion of each of first and second horizontal times HT1 and HT2 of the second frame period FP2. Further, the third switching signal SWS3 may have an off-level in the entire period of each of the first and second horizontal times HT1 and HT2 of the second frame period FP2, and the fourth switching signal SWS4 may have the off-level in the entire period of each of the first and second horizontal times HT1 and HT2 of the first frame period FP1.

Accordingly, as illustrated in FIG. 10, in the first frame period FP1, data voltages RV1, GV1, BV1, BV2, GV3 and RV2 corresponding to first, second, third, fifth, sixth and seventh sub-pixels R1, G1, B1, B2, G3 and R2 may be respectively provided to the first, second, third, fifth, sixth and seventh sub-pixels R1, G1, B1, B2, G3 and R2, and no data voltage is provided to fourth and eighth sub-pixels G2 and G4. Thus, the fourth and eighth sub-pixels G2 and G4 may not emit light in the first frame period FP1. Further, in the second frame period FP2, data voltages RV1, BV1, GV2, BV2, RV2 and GV4 corresponding to first, third, fourth, fifth, seventh and eighth sub-pixels R1, B1, G2, B2, R2 and G4 may be respectively provided to the first, third, fourth, fifth, seventh and eighth sub-pixels R1, B1, G2, B2, R2 and G4, and no data voltage is provided to second and sixth sub-pixels G1 and G3. Thus, the second and sixth sub-pixels G1 and G3 may not emit light in the first frame period FP1. Accordingly, in both cases FP1 and FP2, power consumption of the display device 200 according to embodiments may be reduced.

Figure 11:
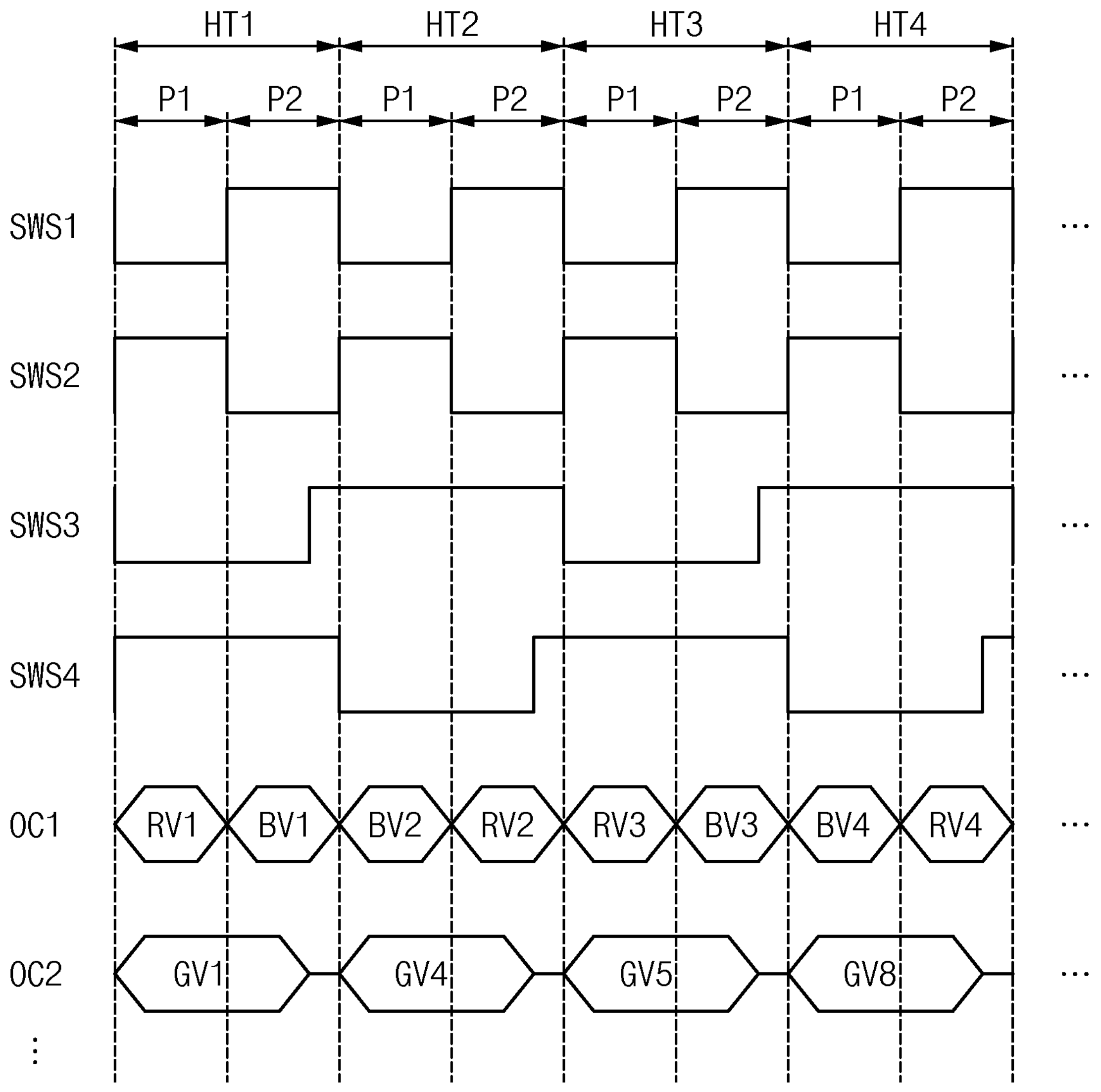
FIG. 11 is a timing diagram for describing an example of an operation of a demultiplexer circuit according to embodiments.

FIG. 11 is a timing diagram for describing an example of an operation of a demultiplexer circuit according to embodiments, and FIG. 12 is a diagram for describing an example of data voltages provided to sub-pixels according to embodiments. The timing diagram illustrated in FIG. 11 may be similar to a timing diagram illustrated in FIG. 7, except that a third switching signal SWS3 has an on-level in odd-numbered horizontal times HT1 and HT3, and a fourth switching signal SWS4 has the on-level in even-numbered horizontal times HT2 and HT4.

Referring to FIGS. 4 and 11, the display device 200 according to embodiments may sequentially provide data voltages to each pair of adjacent red and blue sub-pixels (e.g., R1 and B1) in a time division manner in each horizontal time. Further, in a case where any one of a plurality of pairs of adjacent two green sub-pixels (e.g., G1 and G2) in each row of a display panel 210 has a gray level difference greater than a reference difference, the display device 200 may sequentially provide data voltages to each pair of the adjacent green sub-pixels in the row in each horizontal time. However, in a case where all of the pairs of the adjacent two green sub-pixels in the row have gray level differences less than or equal to the reference difference, the display device 200 may provide a data voltage to a left green sub-pixel of each pair of the adjacent green sub-pixels in the row in the odd-numbered horizontal times HT1 and HT3, and may provide a data voltage to a right green sub-pixel of each pair of the adjacent green sub-pixels in the row in the even-numbered horizontal times HT2 and HT4.

For example, in a case where all of the plurality of pairs of adjacent two (consecutive) green sub-pixels in each of first through fourth rows of the display panel 210 have gray level differences less than or equal to the reference difference (e.g., as illustrated in FIG. 11), the third switching signal SWS3 may have the on-level in at least a portion of each of first and third horizontal times HT1 and HT3, and the fourth switching signal SWS4 may have the on-level in at least a portion of each of second and fourth horizontal times HT2 and HT4. Further, the third switching signal SWS3 may have an off-level in the entire period of each of the second and fourth horizontal times HT2 and HT4, and the fourth switching signal SWS4 may have the off-level in the entire period of each of the first and third horizontal times HT1 and HT3.

Accordingly, as illustrated in FIG. 12, in the first frame period FP1, data voltages RV1, BV1, BV2, RV2, RV3, BV3, BV4 and RV4 corresponding to red and blue sub-pixels R1, B1, B2, R2, R3, B3, B4 and R4 may be respectively provided to the red and blue sub-pixels R1, B1, B2, R2, R3, B3, B4 and R4. Also, data voltages GV1 and GV5 corresponding to left green sub-pixels G1 and G5 in the first and third rows may be respectively provided to the left green sub-pixels G1 and G5 in the first and third rows, and data voltages GV4 and GV8 corresponding to right green sub-pixels G4 and G8 in the second and fourth rows may be respectively provided to the right green sub-pixels G4 and G8 in the second and fourth rows. However, according to this arrangement, no data voltage is provided to right green sub-pixels G2 and G6 in the first and third rows and left green sub-pixels G3 and G7 in the second and fourth rows. Accordingly, power consumption of the display device 200 according to embodiments may be reduced.

Figure 13:
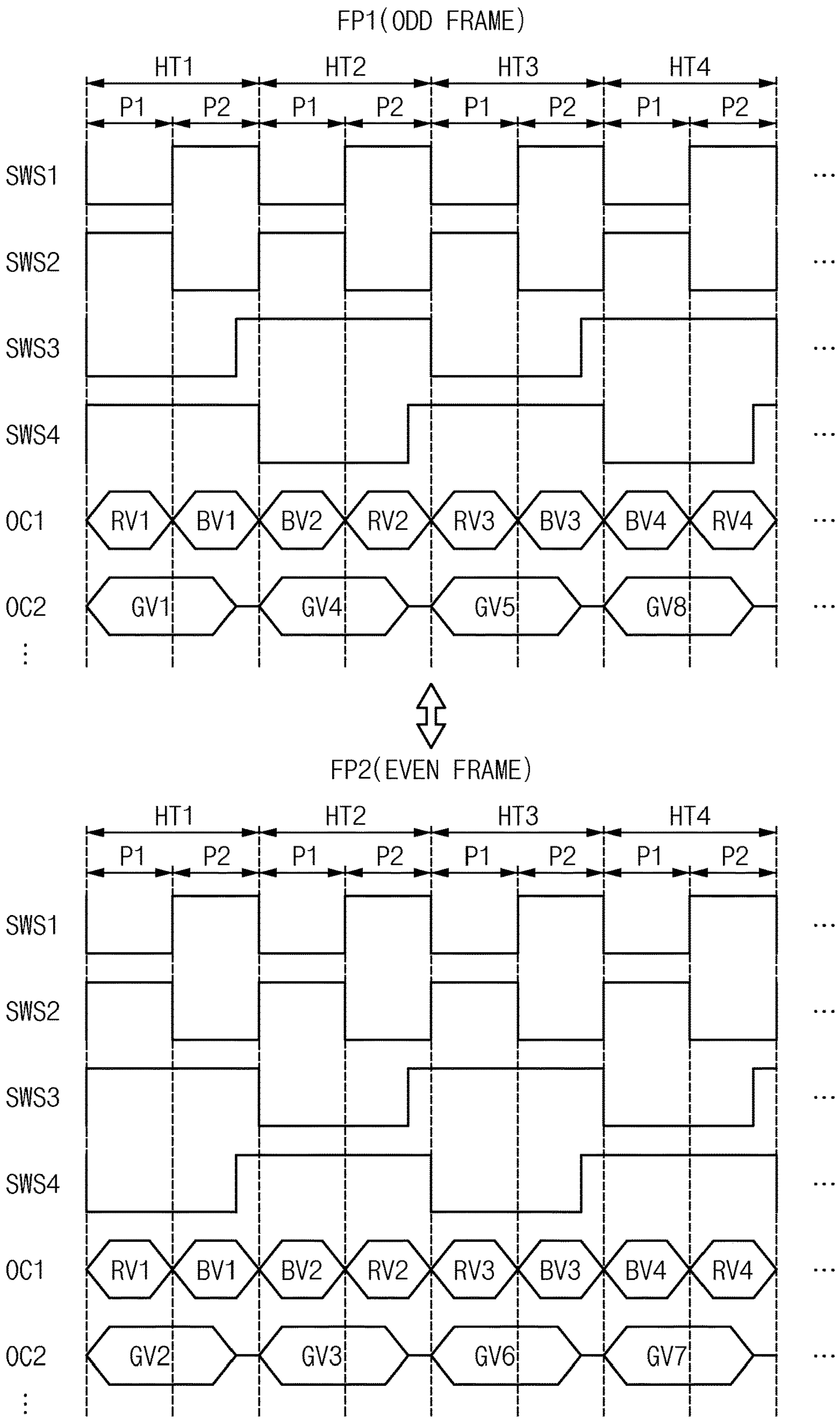
FIG. 13 is a timing diagram for describing an example of an operation of a demultiplexer circuit according to embodiments.

FIG. 13 is a timing diagram for describing an example of an operation of a demultiplexer circuit according to embodiments, and FIG. 14 is a diagram for describing an example of data voltages provided to sub-pixels according to embodiments. The timing diagram illustrated in FIG. 13 may be similar to the timing diagram illustrated in FIG. 11, except that levels of third and fourth switching signals SWS3 and SWS4 are switched between a first frame period FP1 and a second frame period FP2.

Referring to FIGS. 4 and 13, display device 200 according to embodiments may sequentially provide data voltages to each pair of adjacent red and blue sub-pixels (e.g., R1 and B1) in a time division manner in each horizontal time. Further, in a case where any one of a plurality of pairs of adjacent two (consecutive) green sub-pixels (e.g., G1 and G2) in each row of a display panel 210 has a gray level difference greater than a reference difference, the display device 200 may sequentially provide data voltages to both sub-pixels in each pair of the adjacent green sub-pixels in the row in each horizontal time.

However, in a case where all of the pairs of the adjacent two green sub-pixels in the row have gray level differences less than or equal to the reference difference, in the first frame period FP1 (e.g., an odd-numbered frame period), the display device 200 may provide a data voltage to only one of the green sub-pixels in each layer, e.g., may provide a data voltage to a left green sub-pixel of each pair of the adjacent green sub-pixels in the row in the odd-numbered horizontal times HT1 and HT3, and may provide a data voltage to a right green sub-pixel of each pair of the adjacent green sub-pixels in the row in the even-numbered horizontal times HT2 and HT4.

Further, in the second frame period FP2 (e.g., an even-numbered frame period), the display device 200 may provide a data voltage to a right green sub-pixel of each pair of the adjacent green sub-pixels in the row in the odd-numbered horizontal times HT1 and HT3, and may provide a data voltage to a left green sub-pixel of each pair of the adjacent green sub-pixels in the row in the even-numbered horizontal times HT2 and HT4.

For example, in a case where all pairs of adjacent two green sub-pixels in each of first through fourth rows of the display panel 210 have gray level differences less than or equal to the reference difference (e.g., as illustrated in FIG. 13), in the first frame period FP1, the third switching signal SWS3 may have the on-level in at least a portion of each of first and third horizontal times HT1 and HT3, and the fourth switching signal SWS4 may have the on-level in at least a portion of each of second and fourth horizontal times HT2 and HT4. Further, the third switching signal SWS3 may have an off-level in the entire period of each of the second and fourth horizontal times HT2 and HT4, and the fourth switching signal SWS4 may have the off-level in the entire period of each of the first and third horizontal times HT1 and HT3.

Further, in the second frame period FP2, the third switching signal SWS3 may have the on-level in at least the portion of each of the second and fourth horizontal times HT2 and HT4, and the fourth switching signal SWS4 may have the on-level in at least the portion of each of the first and third horizontal times HT1 and HT3. Further, the third switching signal SWS3 may have the off-level in the entire period of each of the first and third horizontal times HT1 and HT3, and the fourth switching signal SWS4 may have the off-level in the entire period of each of the second and fourth horizontal times HT2 and HT4.

Accordingly, as illustrated in FIG. 14, data voltages RV1, BV1, BV2, RV2, RV3, BV3, BV4 and RV4 corresponding to red and blue sub-pixels R1, B1, B2, R2, R3, B3, B4 and R4 may be respectively provided to the red and blue sub-pixels R1, B1, B2, R2, R3, B3, B4 and R4. Further, in the first frame period FP1, data voltages GV1 and GV5 corresponding to left green sub-pixels G1 and G5 in the first and third rows may be respectively provided to the left green sub-pixels G1 and G5 in the first and third rows, and data voltages GV4 and GV8 corresponding to right green sub-pixels G4 and G8 in the second and fourth rows may be respectively provided to the right green sub-pixels G4 and G8 in the second and fourth rows. In this case, no data voltage is provided to right green sub-pixels G2 and G6 in the first and third rows and left green sub-pixels G3 and G7 in the second and fourth rows.

Further, in the second frame period FP2, data voltages GV2 and GV6 corresponding to the right green sub-pixels G2 and G6 in the first and third rows may be respectively provided to the right green sub-pixels G2 and G6 in the first and third rows, and data voltages GV3 and GV7 corresponding to the left green sub-pixels G3 and G7 in the second and fourth rows may be respectively provided to the left green sub-pixels G3 and G7 in the second and fourth rows In this case, no data voltage is provided to the left green sub-pixels G1 and G5 in the first and third rows and the right green sub-pixels G4 and G8 in the second and fourth rows. Accordingly, power consumption of the display device 200 according to embodiments may be reduced.

Figure 15:
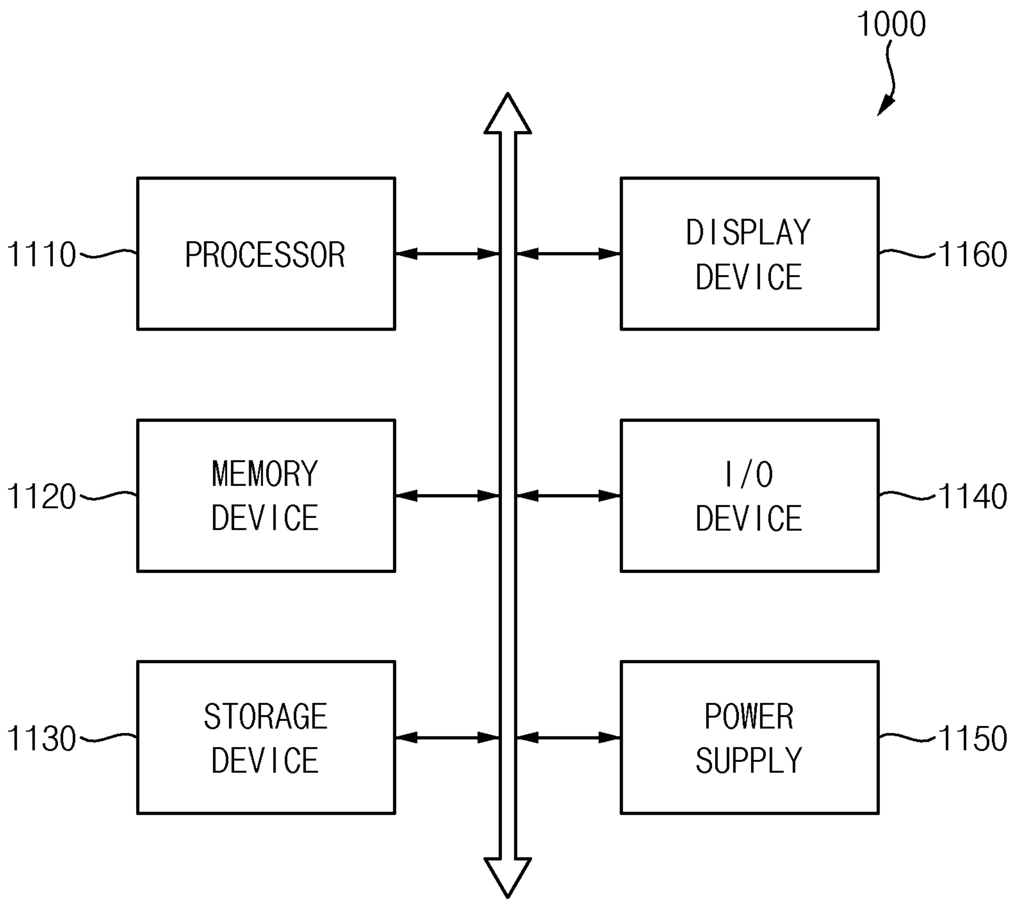
FIG. 15 is a block diagram illustrating an electronic device including a display device according to embodiments.

FIG. 15 is a block diagram illustrating an electronic device including a display device according to embodiments.

Referring to FIG. 15, an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc. and an output device such as a printer, a speaker, etc. The power supply 1150 may supply power for operations of the electronic device 1100. The display device 1160 may be coupled to other components through the buses or other communication links.

In the display device 1160, a demultiplexer circuit in accordance with the embodiments described herein may selectively couple at least one of a first data line and a third data line to a first output channel of a data driver in response to first and second switching signals, and may selectively couple at least one of a second data line and a fourth data line to a second output channel of the data driver in response to third and fourth switching signals different from the first and second switching signals. Accordingly, the number of output channels of the data driver may be reduced, power consumption of the data driver and the display device 1160 may be reduced, and a demultiplexing operation may be efficiently performed. Further, data voltages may be provided to sub-pixels (e.g., green sub-pixels) coupled to the second and fourth data lines in a manner different from a manner in which data voltages are provided to sub-pixels (e.g., red and blue sub-pixels) coupled to the first and third data lines.

The inventive concepts may be applied to any type of display device 1160, and any electronic device 1100 including the display device 1160. For example, the inventive concepts may be applied to a mobile phone, a smart phone, a tablet computer, a television (TV), a digital TV, a 3D TV, a wearable electronic device, a personal computer (PC), a home appliance, a laptop computer, a personal digital assistant (PDA), a portable multimedia player (PMP), a digital camera, a music player, a portable game console, a navigation device, etc.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions for performing the operations of the controller and/or data comparing circuit described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, circuits, drivers, and other signal generating and signal processing features of the embodiments disclosed herein may be implemented, for example, in non-transitory logic that may include hardware, software, or both. When implemented at least partially in hardware, the controllers, processors, devices, circuits, drivers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, circuits, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims. The embodiments may be combined to form additional embodiments.

What is claimed is:

1. A display device, comprising:

a display panel including first, second, third and fourth data lines, and first, second, third and sub-pixels respectively coupled to the first, second, third and fourth data lines;

a data driver including a first output channel and a second output channel;

a demultiplexer circuit configured to selectively couple at least one of the first data line and the third data line to the first output channel in response to corresponding ones of first and second switching signals, and to selectively couple at least one of the second data line and the fourth data line to the second output channel in response to corresponding ones of third and fourth switching signals different from the first and second switching signals; and a data comparing circuit configured to calculate a gray level difference between image data for the second sub-pixel and image data for the sub-pixel, and to compare the gray level difference with a reference difference, the first to fourth switching signals controlled based on a result of the comparison.

2. The display device of claim 1, wherein the first switching signal, the second switching signal, the third switching signal and the fourth switching signal are independently provided on separate switching signal lines.

3. The display device of claim 1, wherein the first and second switching signals are transferred through first and second switching signal lines, and wherein the third and fourth switching signals are transferred through third and fourth switching signal lines different from the first and second switching signal lines.

4. The display device of claim 1, wherein:

the first sub-pixel is configured to emit light having a first color, the second and fourth sub-pixels are configured to emit light having a second color, and the third sub-pixel is configured to emit light having a third color.

5. The display device of claim 4, wherein the first, second, third and sub-pixels are located in a first row, and wherein the display panel further includes:

a fifth sub-pixel located in a second row adjacent to the first row, coupled to the first data line, and configured to emit light having the third color;

a sixth sub-pixel located in the second row, coupled to the second data line, and configured to emit light having the second color;

a seventh sub-pixel located in the second row, coupled to the third data line, and configured to emit light having the first color; and an eighth sub-pixel located in the second row, coupled to the fourth data line, and configured to emit light having the second color.

6. The display device of claim 1, wherein:

the first sub-pixel is a red sub-pixel, the second and sub-pixels are green sub-pixels, and the third sub-pixel is a blue sub-pixel.

7. The display device of claim 1, wherein the demultiplexer circuit includes:

a first switch configured to selectively couple the first output channel to the first data line in response to the first switching signal;

a second switch configured to selectively couple the first output channel to the third data line in response to the second switching signal;

a third switch configured to selectively couple the second output channel to the second data line in response to the third switching signal; and a fourth switch configured to selectively couple the second output channel to the fourth data line in response to the fourth switching signal.

8. The display device of claim 1, wherein each of the first and third switching signals has an on-level in a first period of a horizontal time, and has an off-level in a second period of the horizontal time, and wherein each of the second and fourth switching signals has the off-level in the first period of the horizontal time, and has the on-level in the second period of the horizontal time.

9. The display device of claim 1, wherein the first switching signal has an on-level in a first period of a horizontal time, and has an off-level in a second period of the horizontal time, and the second switching signal has the off-level in the first period of the horizontal time, and has the on-level in the second period of the horizontal time, wherein, in a case where the gray level difference is greater than the reference difference, the third switching signal has the on-level in the first period of the horizontal time, and has the off-level in the second period of the horizontal time, and the fourth switching signal has the off-level in the first period of the horizontal time, and has the on-level in the second period of the horizontal time, and wherein, in a case where the gray level difference is less than or equal to the reference difference, each of the third and fourth switching signals has the on-level in the first period of the horizontal time, and has the off-level in the second period of the horizontal time.

10. The display device of claim 9, wherein, in the case where the gray level difference is less than or equal to the reference difference, a same data voltage is provided to the second sub-pixel and the sub-pixel.

11. The display device of claim 1, wherein the first switching signal has an on-level in a first period of a horizontal time, and has an off-level in a second period of the horizontal time, and the second switching signal has the off-level in the first period of the horizontal time, and has the on-level in the second period of the horizontal time, wherein, in a case where the gray level difference is greater than the reference difference, the third switching signal has the on-level in the first period of the horizontal time, and has the off-level in the second period of the horizontal time, and the fourth switching signal has the off-level in the first period of the horizontal time, and has the on-level in the second period of the horizontal time, and wherein, in a case where the gray level difference is less than or equal to the reference difference, the third switching signal has the on-level in at least a portion of the horizontal time, and the fourth switching signal has the off-level in the entire horizontal time.

12. The display device of claim 11, wherein, in the case where the gray level difference is less than or equal to the reference difference, within the horizontal time, a time length of a period in which the third switching signal has the on-level is longer than a time length of a period in which each of the first and second switching signals has the on-level.

13. The display device of claim 11, wherein, in the case where the gray level difference is less than or equal to the reference difference, a data voltage is provided to the second sub-pixel, and no data voltage is provided to the sub-pixel.

14. An electronic device, comprising the display device according to claim 1.

15. A display device comprising:

a display panel including N data lines, red and blue sub-pixels coupled to (4M+1)-th and (4M+3)-th data lines among the N data lines, and green sub-pixels coupled to (4M+2)-th and (4M+4)-th data lines among the N data lines, where N is a multiple of 4, and M is an integer greater than or equal to 0 and less than N/4;

a data driver including N/2 output channels; and a demultiplexer circuit configured to selectively couple at least one of the (4M+1)-th data line and the (4M+3)-th data line to a (2M+1)-th output channel among the N/2 output channels in response to first and second switching signals, and to selectively couple at least one of the (4M+2)-th data line and the (4M+4)-th data line to a (2M+2)-th output channel among the N/2 output channels in response to third and fourth switching signals different from the first and second switching signals, wherein the display device further comprises:

a data comparing circuit configured to calculate a gray level difference between image data for the green sub-pixels, and to compare the gray level difference with a reference difference, the first to fourth switching signals controlled based on a result of the comparison.

16. A display device, comprising:

a display panel including sub-pixels in an RGBG arrangement;

a demultiplexer configured to apply data voltages to the sub-pixels, wherein the demultiplexer includes switches configured to selectively couple output channels of a data driver to the sub-pixels; and a controller configured to generate switching signals for the switches, the switches including:

a first switch coupled to a red sub-pixel, a second switch coupled to a blue sub-pixel, a third switch coupled to a first green sub-pixel, and a fourth switch coupled to a second green sub-pixel, and wherein the red sub-pixel, the blue sub-pixel, the first green sub-pixel, and the second green sub-pixel are disposed in a same row of the display panel, wherein the controller includes:

a data comparing circuit configured to calculate a gray level difference between image data for the first green sub-pixel and image data for the second green sub-pixel, and to compare the gray level difference with a reference difference, the controller configured to control the switching signals for the first through fourth switches based on a result of the comparison.

17. The display device of claim 16, wherein:

the first switch couples a first output channel of the data driver to the red sub-pixel, the second switch couples the first output channel to the blue sub-pixel, the third switch couples a second output channel of the data driver to the first green sub-pixel, and the fourth switch couples the second output channel to the second green sub-pixel.

18. The display device of claim 17, wherein:

the first switch is on in a first period of a horizontal time and off in a second period of the horizontal time, and the second switch is off in the first period and on in the second period.

19. The display device of claim 18, wherein:

the third switch is on in the first period and off in the second period, and the fourth switch is off in the first period and on in the second period.

20. The display device of claim 18, wherein, when a difference between gray levels of the first green sub-pixel and the second green sub-pixel is less than or equal to a reference difference, the third switch is on in the first period and off in the second period, the fourth switch is on in the first period and off in the second period, the demultiplexer is configured to apply a same voltage to the first green sub-pixel and the second green sub-pixel in the first period and to apply no data voltage to the first green sub-pixel and the second green sub-pixel in the second period.

21. The display device of claim 18, wherein, when a difference between gray levels of the first green sub-pixel and the second green sub-pixel is less than or equal to a reference difference, the third switch is on in the first period and on in a first portion of the second period and off in a second portion of the second period, to apply a voltage to the first green sub-pixel, the fourth switch is off in the first period and the second period such that no voltage is applied to the second green sub-pixel.

* * * * *